(12) United States Patent
San Agustin Lopez

(10) Patent No.: US 10,067,561 B2
(45) Date of Patent: Sep. 4, 2018

(54) DISPLAY VISIBILITY BASED ON EYE CONVERGENCE

(71) Applicant: Facebook, Inc., Menlo Park, CA (US)

(72) Inventor: Javier San Agustin Lopez, Copenhagen (DK)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/860,384

(22) Filed: Sep. 21, 2015

(65) Prior Publication Data

US 2016/0085301 A1 Mar. 24, 2016

Related U.S. Application Data

(60) Provisional application No. 62/053,545, filed on Sep. 22, 2014.

(51) Int. Cl.
*G06F 3/01* (2006.01)
*G06K 9/00* (2006.01)
(Continued)

(52) U.S. Cl.
CPC .......... *G06F 3/013* (2013.01); *G02B 27/0093* (2013.01); *G02B 27/01* (2013.01);
(Continued)

(58) Field of Classification Search
CPC .... G02B 2027/0105; G02B 2027/0107; G02B 2027/0109; G02B 2027/011;
(Continued)

(56) References Cited

U.S. PATENT DOCUMENTS

| 7,986,816 B1 | 7/2011 | Hoanca et al. |
| 8,228,607 B2 * | 7/2012 | Sugihara ............ G02B 27/0172 345/8 |

(Continued)

FOREIGN PATENT DOCUMENTS

| WO | WO-2012052061 A1 | 4/2012 |
| WO | WO-2013138647 A1 | 9/2013 |

(Continued)

OTHER PUBLICATIONS

"International Application Serial No. PCT/EP2015/001876, International Search Report dated Jan. 21, 2016", 4 pgs.

(Continued)

*Primary Examiner* — Grant Sitta
(74) *Attorney, Agent, or Firm* — Fenwick & West LLP

(57) ABSTRACT

Gaze information of a user can be determined by a computing device that analyzes images of the user. Gaze information of a user includes information such as the user's line of sight, point of regard information, the direction of the user's gaze, the depth of convergence of the user's gaze, and the like. The computing device is able to estimate the distance from the user at which the user is focusing (for example, at a screen near the user or at an object farther away). The visibility and display characteristics of objects displayed on the HUD may be based on the gaze information. For example, content on a heads-up display (HUD) on a windshield may be more transparent while the user is looking through the windshield and more opaque (or otherwise enhanced) while the user is focusing on the HUD.

15 Claims, 13 Drawing Sheets

(51) Int. Cl.
  *H04N 5/232* (2006.01)
  *H04N 17/00* (2006.01)
  *H04N 13/00* (2018.01)
  *G06F 3/147* (2006.01)
  *G02B 27/00* (2006.01)
  *G02B 27/01* (2006.01)

(52) U.S. Cl.
  CPC .............. *G06F 3/012* (2013.01); *G06F 3/147* (2013.01); *G06K 9/00604* (2013.01); *H04N 5/23219* (2013.01); *H04N 13/0022* (2013.01); *H04N 17/002* (2013.01); *G09G 2380/10* (2013.01)

(58) Field of Classification Search
  CPC .... G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 27/01; G02B 27/0093; G06F 3/013; G06F 3/012; G06F 3/147; G06F 1/1632; G06F 3/0416; G06F 3/044; H04N 13/0022; H04N 17/002; H04N 5/23219; G06K 9/00604; G09G 2380/10; G09G 5/003; G09G 5/363; G09G 2320/08; B60R 11/02; B60R 2011/0005; B60R 11/0252; B60R 11/0241; B60R 2011/0007
  USPC .......................................................... 345/7–8
  See application file for complete search history.

(56) References Cited

U.S. PATENT DOCUMENTS

| | | | | |
|---|---|---|---|---|
| 9,317,114 B2* | 4/2016 | Hwang | ................... | G06F 3/013 |
| 9,746,739 B2* | 8/2017 | Alton | ...................... | G02F 1/167 |
| 2002/0044152 A1* | 4/2002 | Abbott, III | .............. | G06T 11/00 |
| | | | | 345/629 |
| 2006/0066567 A1* | 3/2006 | Scharenbroch | ........ | G02B 27/01 |
| | | | | 345/156 |
| 2006/0227116 A1 | 10/2006 | Zotov et al. | | |
| 2010/0201823 A1* | 8/2010 | Zhang | .................. | H04N 5/2256 |
| | | | | 348/164 |
| 2011/0228975 A1* | 9/2011 | Hennessey | ............. | A61B 3/113 |
| | | | | 382/103 |
| 2011/0310006 A1 | 12/2011 | Edwards et al. | | |
| 2012/0068913 A1* | 3/2012 | Bar-Zeev | ............. | G02B 26/026 |
| | | | | 345/8 |
| 2012/0113092 A1* | 5/2012 | Bar-Zeev | ............. | G02B 27/017 |
| | | | | 345/419 |
| 2012/0215403 A1* | 8/2012 | Tengler | ................. | B60W 50/12 |
| | | | | 701/36 |
| 2012/0256823 A1* | 10/2012 | Lee | ......... | G06F 3/011 |
| | | | | 345/156 |
| 2012/0293548 A1* | 11/2012 | Perez | ...................... | G06F 3/012 |
| | | | | 345/633 |
| 2013/0083003 A1* | 4/2013 | Perez | ...................... | G06F 3/005 |
| | | | | 345/419 |
| 2013/0241907 A1* | 9/2013 | Amirparviz | ........ | G02B 27/0093 |
| | | | | 345/207 |
| 2013/0300634 A1 | 11/2013 | White et al. | | |
| 2013/0335303 A1* | 12/2013 | Maciocci | ............. | G02B 27/017 |
| | | | | 345/8 |
| 2014/0333521 A1* | 11/2014 | Hwang | .................... | G06F 3/013 |
| | | | | 345/156 |
| 2015/0009334 A1* | 1/2015 | Kwon | ................. | H04N 5/23293 |
| | | | | 348/164 |
| 2015/0123997 A1* | 5/2015 | Hayasaka | ............ | G02B 27/017 |
| | | | | 345/633 |
| 2015/0192992 A1* | 7/2015 | Di Censo | ................ | G02B 27/01 |
| | | | | 345/156 |
| 2017/0091550 A1* | 3/2017 | Feng | .................. | G06K 9/00617 |

FOREIGN PATENT DOCUMENTS

| | | |
|---|---|---|
| WO | WO-2014037953 A2 | 3/2014 |
| WO | WO-2016045784 A1 | 3/2016 |

OTHER PUBLICATIONS

"International Application Serial No. PCT/EP2015/001876, Written Opinion dated Jan. 21, 2016", 5 pgs.

Canadian Intellectual Property Office, Office Action, Canadian Patent Application No. 2,961,830, dated Nov. 15, 2017, three pages.

\* cited by examiner

DISPLAY VISIBILITY BASED ON EYE CONVERGENCE

CROSS REFERENCE TO RELATED APPLICATIONS

This application claims priority to U.S. Provisional Patent Application Ser. No. 62/053,545, filed Sep. 22, 2014, which is incorporated in its entirety herein by reference.

TECHNICAL FIELD

The present disclosure generally relates to user interfaces and controls that use eye tracking and, more specifically, to systems and methods for adjusting display visibility based on eye convergence.

BRIEF DESCRIPTION OF THE DRAWINGS

Some example embodiments are illustrated by way of example and not of limitation in the figures of the accompanying drawings.

DETAILED DESCRIPTION

Glossary

Figure 1:
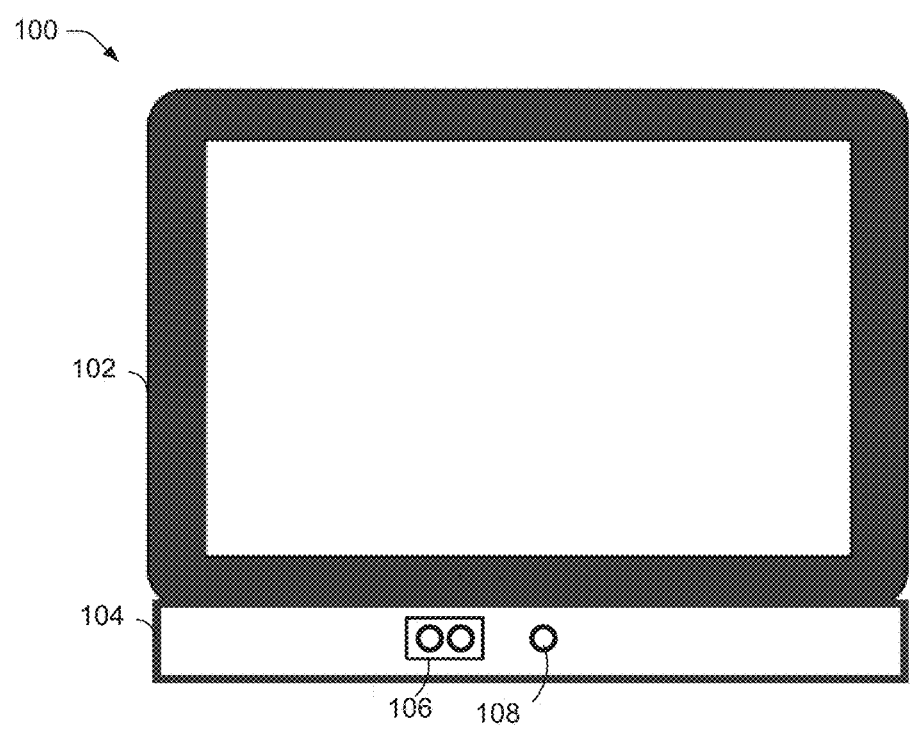
FIG. 1 is a device diagram of an example computing device coupled to a docking device capable of adjusting display visibility based on eye convergence, according to some embodiments.

"Display" in this context refers to an output device for visual information. Display technologies may include CSTN, TFT, TFD or OLED. There are also types of touchscreen displays, e.g. capacitive and resistive. A display device includes an output device for presentation of information in visual or tactile form.

"HUD" in this context refers to a head-up display or heads-up display and includes any transparent display that presents data without requiring users to look away from their usual viewpoints.

Description

Example systems and methods to adjust display visibility based on eye convergence are described. In the following description, for purposes of explanation, numerous specific details are set forth in order to provide a thorough understanding of example embodiments. It will be evident, however, to one skilled in the art that the present technology may be practiced without these specific details.

Example embodiments include an eye tracking system that uses eye tracking information to determine whether information displayed on a transparent display (e.g. a heads-up display or a head-mounted display) should be readable to the user or not. When the eye tracking system detects the user is not looking at the information on the display, the information is made more transparent. When the user looks at the display, the presentation of the information (and the display environment) maybe enhanced to allow the user to easily view the information on the display.

Eye tracking information may be used to interact with objects on the display. For example, detection that a user is looking at a specific object on the display for a specific amount of time may invoke a command so that more information appears on the display. A heads-up display (HUD) may be used in different scenarios (e.g. projected on the windshield of a car, or projected on a head-mounted screen that the user wears in front of the eye(s)). In some example embodiments, the information is presented on a transparent display so that the user can see the "real world" through the display. For instance, a heads-up display presented on a car's windshield may provide the driver with information like speed, RPM, navigation directions, etc. Presenting the information on the windshield prevents the user from looking away from the road to check on navigation directions or other car information.

However, the information overlaid on the heads-up display may disturb and/or distract the user while he or she is looking at a real world object. In the case of a car's heads-up display, information displayed on the windshield may be distracting when the driver is focusing on the road, other cars and pedestrians, and can even pose a safety risk.

Example embodiments described herein seek to address this issue by combining eye tracking information with the "display" so that the information may be presented in a very subtle way (e.g., so as to be almost invisible) when the user is looking at objects in the real world, and enhanced when the user looks at the information presented in the display. Different ways to enhance the information may include increasing the opacity of the display of the information (as opposed to being mostly transparent when not looking at the display), to make it more focused (as opposed to being blurred), to expand the interface (as opposed to being collapsed on e.g. one corner), to change colors so text is more readable, etc.

For instance, if a user is driving a car that can present information on the HUD displayed on the windshield, the HUD may terminate the display any information, or display any information in a largely transparent manner, when the system detects the user is looking at the road or objects on it. In this way the user is not distracted by the HUD. When the user looks at the windshield, the system may detect that event (e.g. by computing the point of regard of the user's gaze and/or analyzing the convergence point of the user's eyes in 3D space) and display relevant information, or increase the opacity of the information being displayed in order to help the user see such information. Once the driver looks at the road again, the information on the heads-up display fades out so the driver is not distracted.

A further embodiment contemplates that a user is wearing a pair of glasses with a transparent display. The system may detect when the user is focusing his or her gaze on the display by using (e.g., eye convergence). Eye convergence information may be combined with on-screen point of regard information in order to determine the focus point of the user's gaze.

Example embodiments may also be applied within virtual reality environments. For instance, a virtual reality headset may include an eye tracking system to track the user's eye movements in real time. Information displayed within a virtual scene may be enhanced when the system detects that the user is looking at that information, in a similar fashion as described above.

A user of a computing device may interact with and control objects and applications displayed on the computing device through the user's eye movement. An image of the user's eyes or face, captured by a camera on the computing device or on a device coupled to the computing device, may be analyzed using computer-vision algorithms, such as eye tracking and gaze detection algorithms. For example, the captured images may be processed to extract information relating to features of the user's eyes or face. The computing device may then use the extracted information to determine the location and orientation of the user's eyes and estimate gaze information of the user. Gaze information of a user is an estimation of where the user is looking and may include information such as a user's line of sight, point of regard, the depth of convergence of the user's gaze, and the like. The point of regard of a user is the point in 3-D space on which the user is focusing, and is defined as the point at which the visual axes of the user's eyes intersect. The user's line of sight is the vector that defines the direction from the user to the user's point of regard. The line of sight bisects the angle formed by the visual axes at the point of regard and lies in the same plane as the visual axes. The depth of convergence of the user's gaze is the distance from the user to the point of regard, as measured along the line of sight. The terms "depth of focus" and "depth of convergence" may be used interchangeably.

For example, the computing device may be able to estimate the depth of focus. The depth of focus may correspond to a plane on which the user is focusing (e.g., at a screen near the user or at an object farther away). For example, when multiple planes in the same direction are available, the plane of focus may be identified by matching the depth of focus to the distance of the plane from the user. When the depth of focus does not exactly match the distance to either plane, the closest-matching plane may be used. The estimation of where the user is looking may be used to direct one or more objects, applications, and the like to perform a particular operation. One such operation is modifying the visibility (e.g., the attributes of dimness, brightness, transparency, opacity, translucency, blurriness, clarity, size, or location) of information on a screen. For example, content on a screen may be more transparent while the user is looking through it and more opaque while the user is focusing on it. As another example, content may be small and located in one corner of the screen while the user is looking elsewhere, then be moved to the center of the screen and enlarged when the user looks at the corner, then restored to its original position and size when the user again looks through the screen at what lies beyond.

A user calibration process may be conducted when the user begins using the computing device in order to calculate calibration parameters associated with the user. These calibration parameters may be taken into account to accurately determine the location of the user's eyes and estimate the distance from the user at which the user is looking. The calibration parameters may also be taken into account to determine the direction of the gaze for each eye of the user as a three-dimensional (3-D) vector in space (e.g., line of sight). In such case, information about the hardware geometry may be required, such as camera parameters, location of screen with respect to the camera, and the like.

FIG. 1 is a device diagram of an example combined device 100 comprising computing device 102 coupled to a docking device 104 capable of facilitating eye tracking control. Eye tracking control refers to the control of a device, or software running on a device, based on tracking the eye activity of a user. For example, based on the position or motion of a user's eyes, objects on a screen can be moved, text can be input, visibility attributes can be modified, user interfaces can be interacted with, and so on. A visibility attribute is any attribute that can affect the visibility of a screen or display or any item or object on the screen or display. Accordingly, a visibility attribute may be an attribute of the information presented on a display, or an attribute of a display itself. Where the display is a HUD, the opacity of glass on which information is displayed as an example an attribute of the display itself. Example visibility attributes include transparency, translucency, opacity, contrast, brightness, size, color, and so on. The computing device 102 may be any type of computing device, including, but not limited to, a smart phone, a personal digital assistant (PDA), a mobile phone, a computing tablet, an electronic reader, a television, a laptop, a desktop computer, a display device, a head-mounted display, and the like. During eye tracking control, the computing device 102 may be used by the user by holding the computing device 102 with one hand, both hands, or while the computing device 102 is on a stand or resting on a surface. In some embodiments, the computing device 102 is mounted in a vehicle (e.g., a car, boat, or aircraft). The screen of the computing device 102 may have variable translucency.

The docking device 104 may be coupled to the computing device 102 in any manner, such as through a universal serial bus (USB) port on the computing device 102, micro USB port on the computing device 102, and the like. While the docking device 104 of FIG. 1 is depicted at the bottom of the computing device 102, one of ordinary skill in the art will appreciate that the docking device 104 may be located at any suitable location relative to the computing device 102, and may be attached (e.g., connected via a direct electrical connector), or unattached (e.g., communicating over Bluetooth or a wireless network). The docking device 104 may include a camera module 108 and one or more light-emitting diodes (LEDs) 106. For explanatory purposes, the discussion herein will continue to refer to the LEDs 106. However, any appropriate light-emitting source may be used (e.g., an infrared (IR) laser), in place of one or more of the LEDs 106.

The docking device 104 may include any number of infrared LEDs 106 that may be placed in a suitable location in any manner within the docking device 104 (e.g., tilted at an angle such that it points toward the user's face). In some embodiments, the one or more LEDs 106 may be synchronized with the one or more cameras in such a manner that the one or more LEDs are turned on when the one or more cameras are grabbing a frame, and turned off otherwise. In some embodiments, the LEDs may be turned off if no movement has been detected or if the docking device 104 or computing device 102 go into a sleep mode.

In some embodiments, the docking device 104 may also include a suitable type of infrared pass filter (e.g., active, mechanical, high-pass, band-pass, etc.). In some embodiments, the infrared pass filter is a high-pass filter that blocks light below 800 nm in wavelength and allows light above 800 nm in wavelength. In some embodiments, the infrared band pass filter may only allow light between 800 and 900 nm in wavelength to enter the one or more cameras of the camera module 108.

The camera module 108 may include one or more front-facing cameras placed in any suitable location in any manner within the docking device 104 (e.g., tilted at an angle such that it points toward the user's face) and may be used to capture images of the user's eyes or face. In some embodiments, a camera on the computing device 102 is used in combination with camera module 108 in stereo mode. In some embodiments, the camera module 108 may include any one or more of the following: a black and white (e.g., monochrome), color (e.g., RGB) or IR-RGB sensor, running at an appropriate frame rate (e.g., high-definition at 30 frames per second), a lens without an infrared block filter and with an appropriate field of view (e.g., large enough to capture both of the user's eyes in a single frame and to encompass the area in which the user's head is expected to move), and depth of field (e.g., approximately 30-80 cm for a mobile device, and approximately 2-5 meters for a television), and the like. The one or more cameras in the camera module 108 may be positioned such that the one or more cameras are tilted toward a user's face.

The eye tracking control software may analyze the images taken by the camera module 108 to provide screen coordinates (x, y) of where the user is looking on the display of the computing device 102. These coordinates may be used for any number of applications (e.g., scrolling, moving objects, selecting icons, playing games, etc.). The eye tracking control software may further determine the depth at which the user is looking (e.g., a z value). Based on the depth, a plane other than the screen may be identified (e.g., a second screen or a road) and coordinates (x, y) in this plane determined. For example, the user's focus may be on a second screen adjacent to or behind the first. As another example, a driving user's focus may be on the road immediately in front of the user's car, at a distance far ahead of the car, in the lane containing oncoming traffic, and so on. The identification of the plane along with the coordinates within the plane may be used for any number of applications (e.g., controlling software applications on the second screen, generating a warning if the driver's focus leaves the road for too long, steering the direction of the vehicle headlights, etc.).

Figure 2:
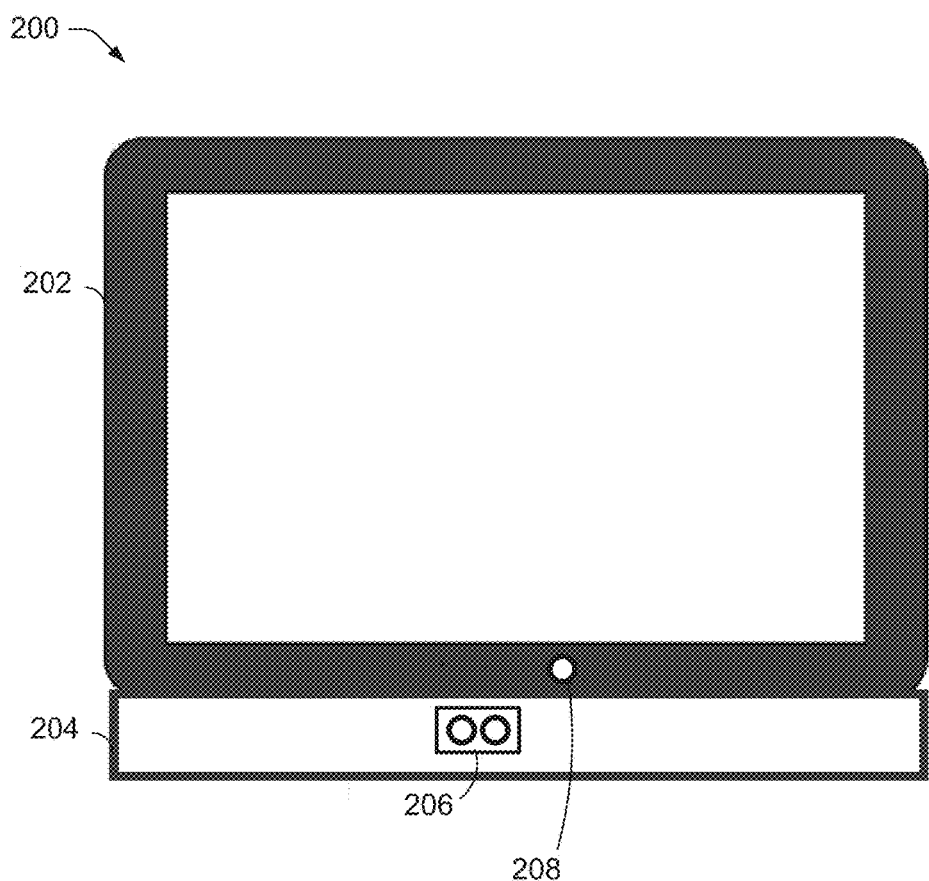
FIG. 2 is a device diagram of another example of a computing device coupled to a docking device capable of adjusting display visibility based on eye convergence, according to some embodiments.

FIG. 2 is a device diagram 200 of another example of a computing device 202 coupled to a docking device 204 capable of facilitating eye tracking control. The example shown in FIG. 2 may operate similarly to the example shown in FIG. 1 and may incorporate any one or combination of features described for FIG. 1. However, FIG. 2 shows that the docking device 204 may be integrated with LEDs 206, and a camera module 208 of the computing device 202 may be used (instead of the camera module 108 being integrated with the docking device 104). In some embodiments that couple the computing device 202 with the docking device 204 using a USB, a micro-USB port, or a proprietary port, the configuration depicted in FIG. 2 may allow for faster transfer of images from the camera since the camera of the computing device 202 is used to capture the images. One or more front-facing cameras for eye tracking control may be used while simultaneously using one or more front-facing and back-facing cameras.

Figure 3A:
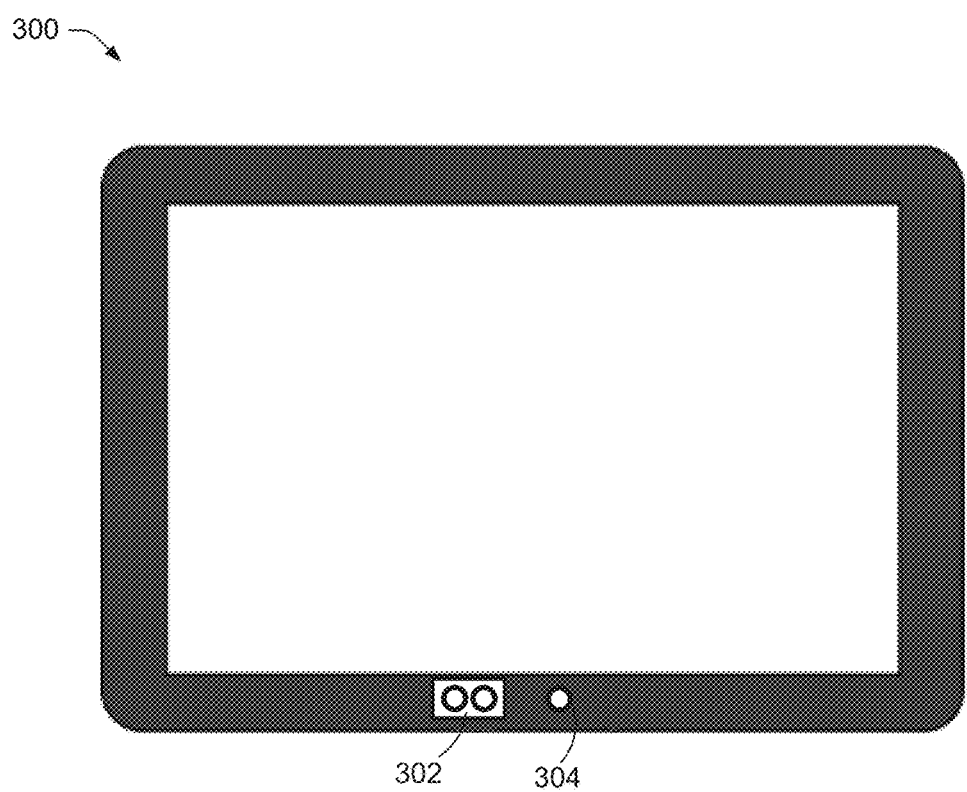
FIGS. 3A-3B are device diagrams of example computing devices capable of adjusting display visibility based on eye convergence, according to some embodiments.
Figure 3B:
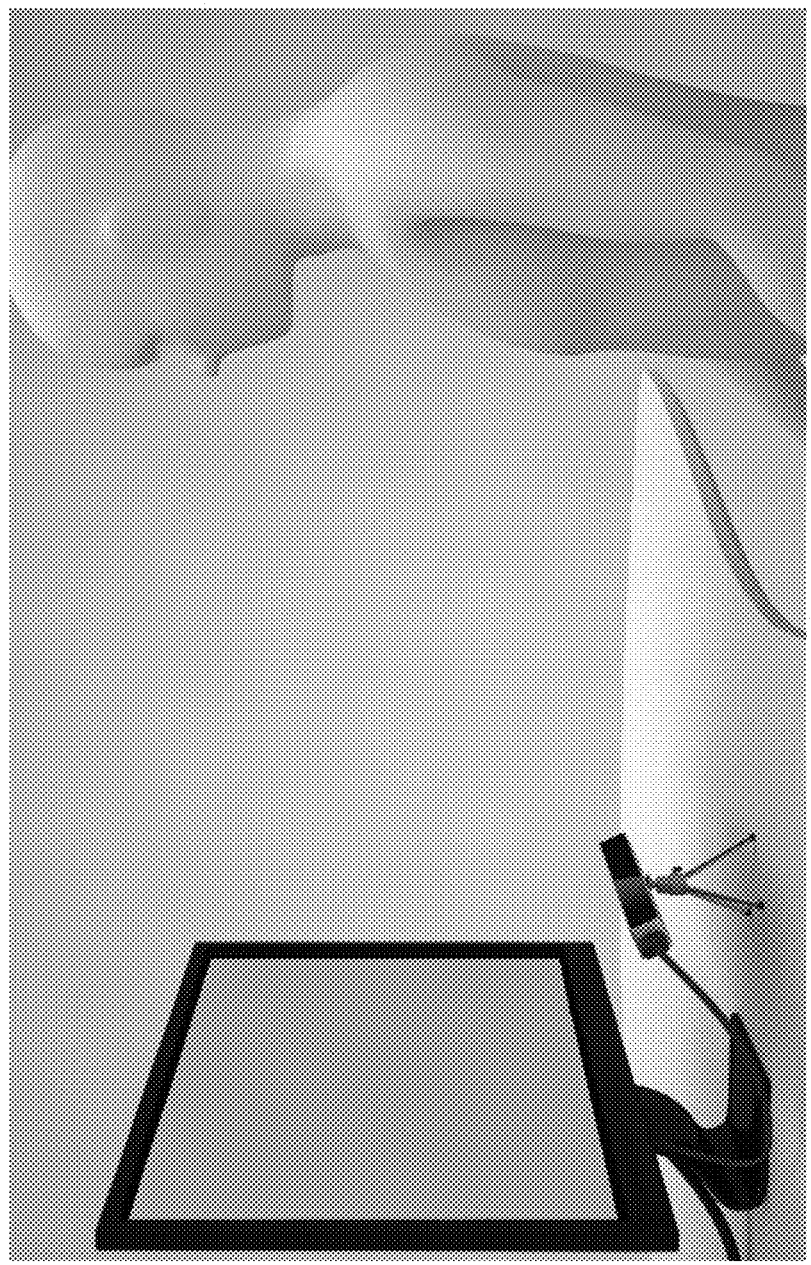

FIGS. 3A-3B are device diagrams of example computing devices capable of facilitating eye tracking control. The example shown in FIG. 3A may operate similarly to the example shown in FIG. 1 and may incorporate any one or combination of features described for FIG. 1. However, the LEDs and camera modules are integrated into the computing device (instead of being part of a docking device). The computing device, in turn, may be integrated into another vehicle or appliance (e.g., a refrigerator, dishwasher, washing machine, or dryer).

FIG. 3B illustrates an eye tracking device that is not attached to the screen of the computing device. In some embodiments, the hardware elements of the eye tracking device may be integrated into another vehicle, appliance or the like. For instance, the one or more cameras and the LEDs may be integrated into the dashboard of a vehicle and connected to a computing device.

Figure 4:
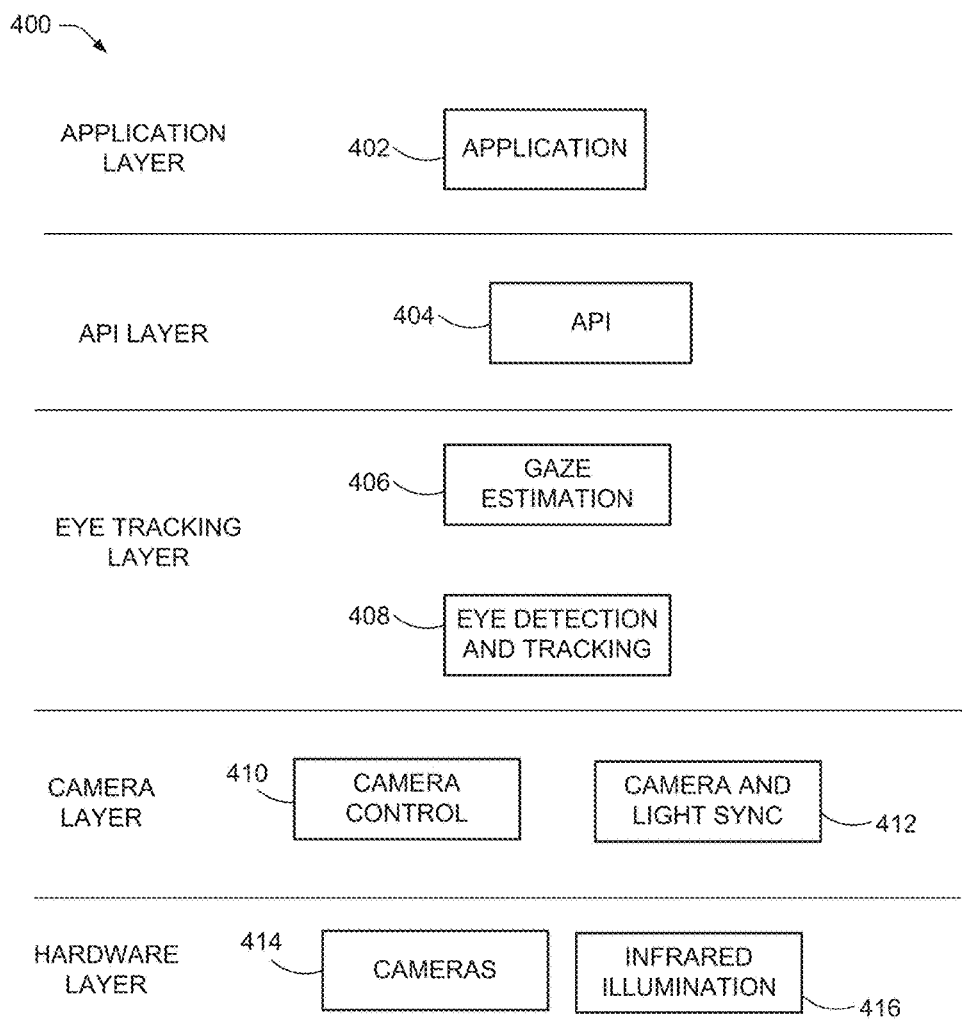
FIG. 4 is a block diagram of an example system architecture for adjusting display visibility based on eye convergence, according to some embodiments.

FIG. 4 is a block diagram of an example system architecture 400 for facilitating eye tracking control. Any one or more of the components 402-412 of the system architecture 400 may be run on a control processing unit (CPU) of the computing device, a graphics processing unit (GPU) of the computing device, a dedicated chip of the computing device, a cloud-based computing device, or any combination of these. In some embodiments, any one or more of the components 402-412 of the system architecture 400 may include software running on a dedicated chip. The software may run as a background process (e.g. as part of the operating system (OS), in a web browser, etc.) and may provide an application programming interface (API) 404 that other applications can access. The API 404 may raise an event or use some other similar mechanism to send the information of where the user is looking on a screen or in 3D space to other applications. In some embodiments, these applications may be executed on a different computing device.

The system architecture 400 may be divided into different layers. The hardware layer may include a camera module 414 and an infrared illumination module 416 that may correspond to the respective hardware (e.g. the camera, the infrared illumination, etc.). A camera layer may include a camera control module 410 that may be in charge of communicating with the one or more cameras in order to perform camera operations such as, for example, starting the camera, grabbing images, controlling the camera properties, and the like. This layer may also include a camera and light sync module 412, which may synchronize the one or more cameras and the infrared emitters so that the lights are turned on by the eye tracking software in order to improve tracking of the user's eyes and minimize energy consumption. In some embodiments, the camera layer may be configured to strobe the infrared LEDs at the frequency of the camera trigger output.

The camera layer may deliver images to the eye tracking layer or eye tracking engine. In the eye tracking layer, a gaze estimation module 406 may process images to find features like face location, eye region location, pupil center, pupil size, location of the corneal reflections, eye corners, iris center, iris size, and the like. These features may be used by the eye detection and tracking module 408 in the gaze estimation stage, which may be in charge of calculating the point of regard of the user. The point of regard of the user may be a location on the display where the user is looking, a location on another plane where the user is looking, a three-dimensional point where the user is looking, or a plane where the user is looking. The gaze estimation module 406 may also calculate the optical and visual axes of the user's eyes and calibrate the calculation based on specific features of the user.

The API layer may be used for communication between the eye tracking layer and applications that use eye gaze information (e.g., OS API, games that employ eye gaze information, etc.). An API module 404 may send data calculated by the eye tracking layer, such as coordinates of the point of regard, 3-D location of the user's eyes, pupil size, distance between the eyes, head orientation, head movement, and the like. The API module 404 may also accept commands from an application to the eye tracking layer (e.g., to start or stop the eye tracking engine, query for specific information, etc.). An application module 402 may connect to the eye tracker's API module 404 and use eye gaze information for any suitable purpose (e.g., control an app or a game, record eye data for visual behavior studies, adjust the transparency of information on a screen, dim or turn off a display, control the direction of headlights, etc.).

Figure 5:
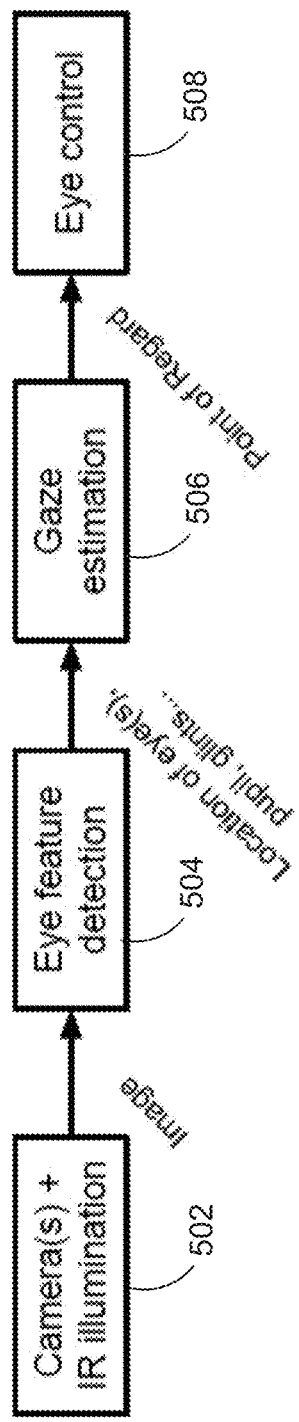
FIG. 5 is a block diagram of an example flow of data used to adjust display visibility based on eye convergence, according to some embodiments.

FIG. 5 is a block diagram of an example flow of data used to facilitate eye tracking control. The one or more cameras and the infrared LED illumination modules 502 may capture an image of the user. The eye feature detection module 504 may use the captured data to detect eye features (e.g., location and orientation of eyes, pupils, irises, corneal reflections, etc.). Using the detected eye features, the gaze estimation module 506 may estimate the user's point of regard or line of sight, which may then be used to control aspects of an application through the eye control module 508. In some embodiments, the gaze estimation module 506 may use a set of calibration parameters in combination with the detected eye features to estimate the user's point of regard or line of sight.

In some example embodiments, a calibration process is automatically conducted when the user initially uses the eye tracking functionality. In other example embodiments, the calibration process is performed only at the request of the user. The calibration process calculates calibration parameters specific to the user (e.g., vertical and horizontal offset between optical and visual axes) or parameters of a mapping function that maps eye features on the image coordinate system to the display coordinate system, a depth coordinate system, or the coordinate system of another plane. These calibration parameters and the information of the face and eyes may then be employed to estimate where the user is looking on the screen or plane or the user's line of sight through a gaze estimation algorithm. Any suitable calibration process may be used to calculate the calibration parameters specific to the user. The calibration parameters specific to the user may include any relevant parameters, such as an offset between optical and visual angles, the cornea radius, the distance between cornea center and pupil center, a mapping function that maps from image coordinate system to another coordinate system, and the like.

In order to accommodate a user moving around while maintaining accuracy in the estimated point of regard, a hardware-calibrated setup may be used such that the relative size, location, and characteristics of the hardware components in 3-D space are known, including display size, the location and relative angle of the one or more cameras with respect to the display, the location of the light sources, intrinsic camera parameters, and the like.

Figure 6A:
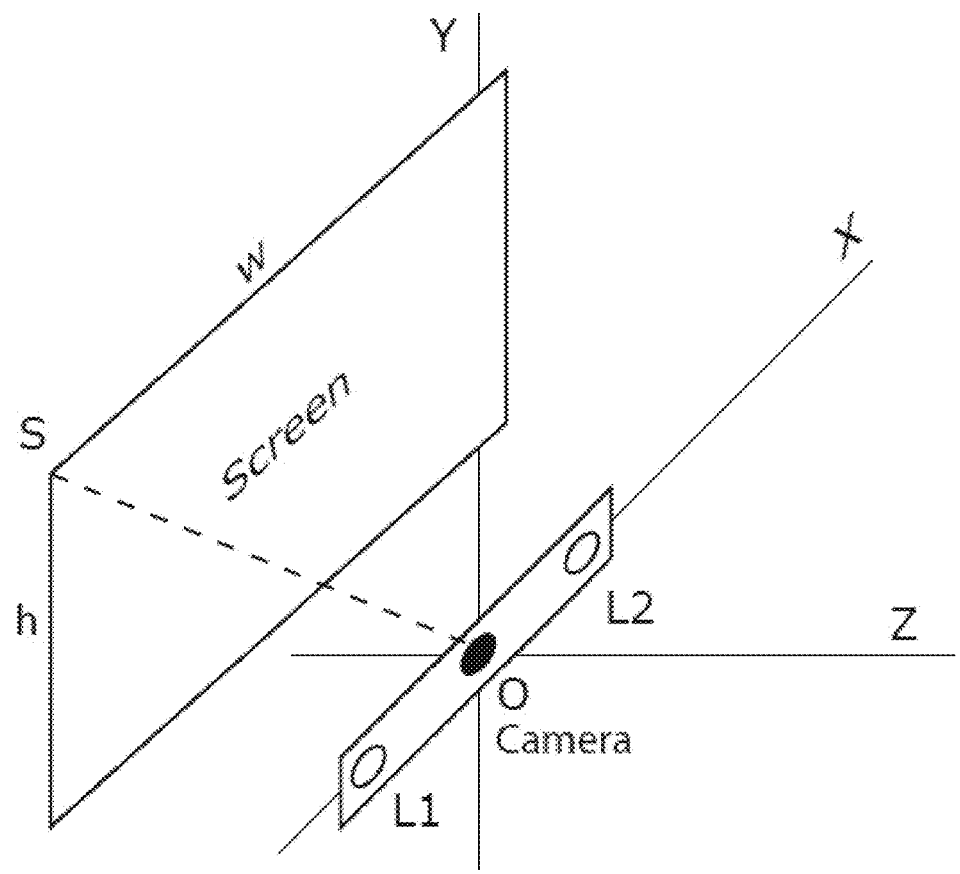
FIGS. 6A-6B are schematic diagrams depicting eye tracking technology relative to a display, according to some embodiments.
Figure 6B:
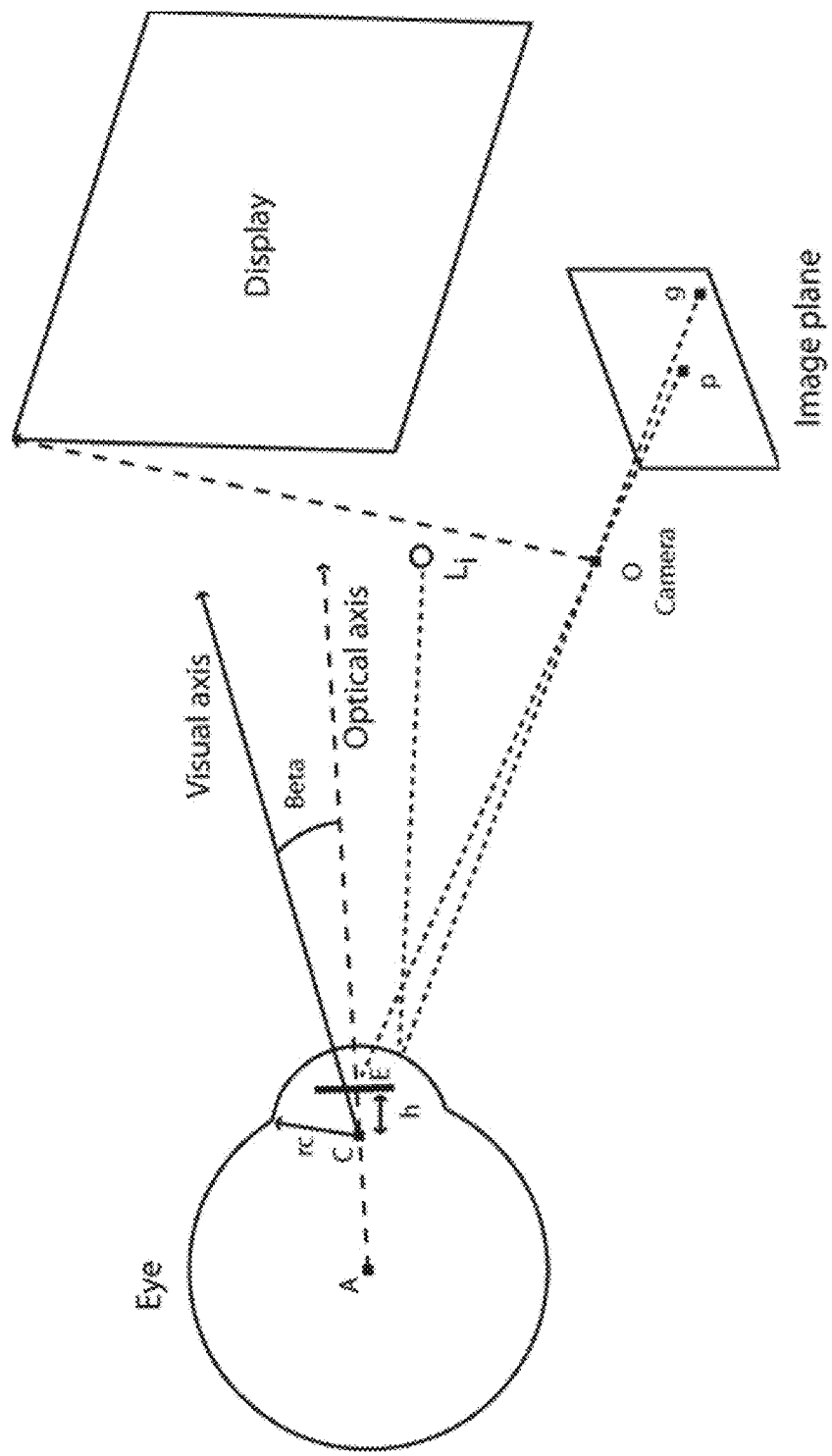

FIGS. 6A and 6B are schematic diagrams depicting eye tracking technology relative to a display. In FIG. 6A, O is the center of the coordinate system XYZ, and and the location of both the one or more cameras and the one or more light sources L with respect to O is known.

In some embodiments, an eye tracking system is built into a screen or is mounted in a specific location on the screen, as described above. In some other embodiments, the components of the eye tracking system (e.g., the one or more cameras and the one or more light sources) are integrated into another element like a car dashboard, a head mounted display, a helmet, etc.

During the user calibration process, one or more objects may be displayed on the screen, and the user may look at these objects as they are being displayed. If two or more calibration objects are displayed at any given time, the system may identify which one the user is looking at by, for example, comparing the path followed by the calibration objects with the path followed by the eyes as they look at the objects. In some embodiments, the user calibration may happen when the user is instructed to look at a portion of the display, such as the corners of the screen, at the light sources, and the like. While calibration objects are displayed, eye information is captured by the eye tracking software. This eye information may include pupil center, pupil ellipse, corneal reflections, eye corners, face features, and the like. The pupil center is the point at the center of the detected pupil. A pupil ellipse is the elliptical representation in an image of a (circular) pupil. The eccentricity of the pupil ellipse is related to the angle between the direction of the user's gaze and the line from the camera to the eye. Corneal reflections are reflected light from the cornea. When the relationship between the light source and the camera is known, the position of corneal reflections of the light source, as measured relative to the pupil center, can be used to identify the gaze direction. During the calibration process, the depth of focus of the eyes may be presumed to be (or measured to be) at the display. This information can be used to calibrate the eye tracking along the z-axis (distance from the user).

In some embodiments, the calibration process takes place while the user is performing a task unrelated to an eye tracking system calibration. For instance, the user may be setting up the device for the first time, and while doing so the eye tracking software may calibrate.

In some embodiments, a calibration of the user eye parameters is not necessary and point of regard or line of sight are computed solely from image data.

FIG. 6B illustrates eye features to be calculated in 3-D space with respect to the origin O such that the visual axis or the optical axis may be computed and intersected with the display plane. The location of the corneal reflections on the image plane, g, can be used in combination with the location of the light sources in 3-D space, L, with respect to the one or more cameras and the intrinsic parameters of the cameras to calculate the location of the cornea center in 3-D space, C. For example, a ray can be traced from each light source L to each camera via the cornea. Each light source camera pair provides a separate ray, and identifies a point on the surface of the cornea. By triangulating between these points, both the corneal radius and the location of C can be determined. When more cameras or light sources are used, the accuracy of the measurement can be increased.

The location of the pupil center on the image plane, p, can be used in combination with the location of the cornea center in 3-D space, C, the optical properties of the eye and air, and the intrinsic parameters of the cameras to calculate the location of the pupil center in 3-D space, E. For example, the camera captures an image of the pupil, but the actual position of the center of the cornea differs from the position directly indicated by the image because the pupil lies behind the cornea and light is refracted at the juncture between the cornea and the air. Accordingly, the apparent position of the pupil center is adjusted to take this refraction into account.

The location of the pupil center E and the location of the cornea center C in 3-D space define a vector, called the optical axis. The line of sight, which may also be known as visual axis, has an angular offset with respect to the optical axis that can be computed through the user calibration in instances where the optical axis does not provide enough accuracy. The angular offsets in x and y directions are known as alpha and beta and are usually around 5° horizontally and 1.5° vertically, but these values are personal and therefore need to be computed on a per-user basis.

Alpha and beta may be computed by asking the user to look at a sequence of calibration targets displayed on known positions on both the display and in 3-D space, and computing the offset between the calibration targets and the corresponding intersections of the optical axes on the screen plane.

Once the visual axis is known, the ray can be intersected with the screen plane. The intersection provides the on-screen gaze coordinates where the user is looking. Other eye parameters like the corneal radius or the distance between pupil center and corneal center can also be calculated during the user calibration process to improve the accuracy of the computation of on-screen gaze coordinates (due to a better estimation of the cornea center and hence optical and visual axes). Otherwise, average values can be used (e.g., 7.8 mm for the corneal radius).

Figure 7B:
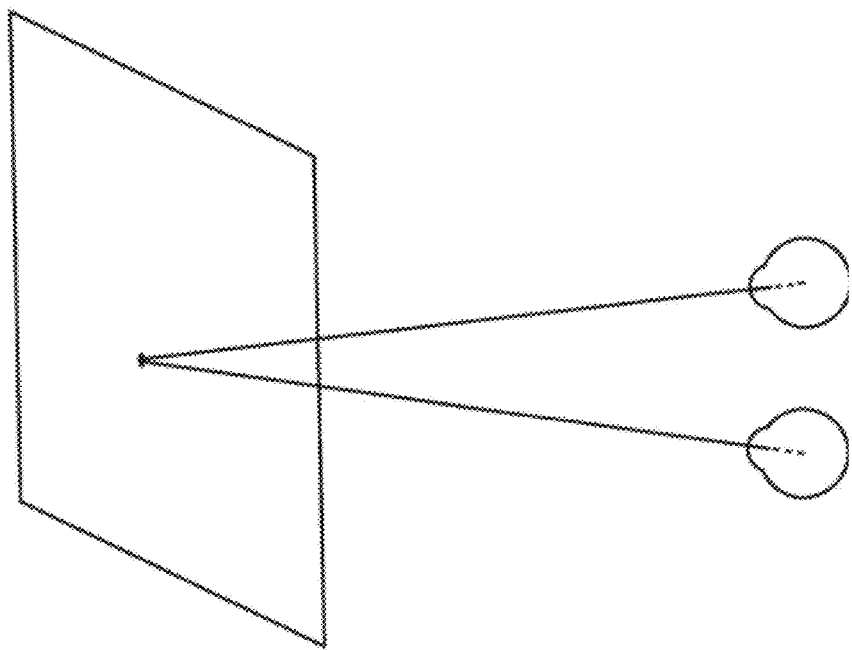
FIGS. 7A-7B are schematic diagrams depicting eye convergence, according to some embodiments.
Figure 7A:
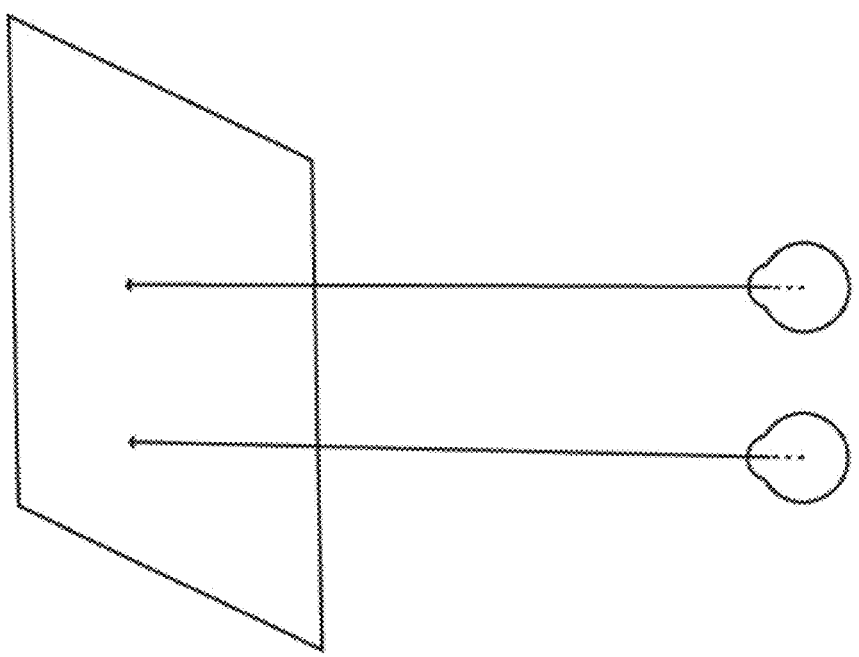

FIGS. 7A and 7B are schematic diagrams depicting eye convergence, according to some embodiments. FIG. 7A shows rays cast along the visual axes of two eyes. The rays are nearly parallel, and converge at some distance beyond the plane (e.g., a plane of a display, of a monitor, of a windshield, etc.). Accordingly, it can be determined that the eyes are not focused on the plane. FIG. 7B also shows rays cast along the visual axes of the two eyes. The rays converge at a point on the plane. Accordingly, it can be determined that the eyes are focused on the plane. The methods discussed above with respect to FIGS. 6A and 6B can be used to determine the visual axis or the optical axis of each eye in FIGS. 7A and 7B.

As another example, identifying the 3-D point of regard can be used in combination with a virtual reality headset that provides one screen for each eye to create a virtual 3-D world for the user. The application 402 can identify a point in the virtual world that corresponds to the identified 3-D point of regard. Based on the identification of a point or an associated object in the virtual world that is receiving the user's focus, different actions can be taken by the application 402. For example, focusing on a distant item may cause the user's character to walk toward the item or the camera to zoom in on the item. Focusing in on a nearby item may cause the character to pick up or otherwise interact with the item. Focusing on an illegible sign may cause text on the sign to be displayed legibly, for example, using subtitles along the bottom of the viewable area, as a tool-tip associated with the sign, by increasing the display resolution of the sign, by enlarging the sign, or otherwise. Additionally, multiple such methods may be used simultaneously.

As yet another example, the 3-D point of regard is used in combination with an augmented reality headset that provides a view of both the real world, as well as virtual objects that are displayed or projected on top of the real world. Based on the point of regard of the user, an application 402 may determine whether the user is looking at the real world or at a virtual object, and different actions may be taken. For instance, if the user is looking at the real world, the display may become more transparent. When the user focuses on a virtual object, the display may become more opaque or the object may be enhanced.

Figure 8A:
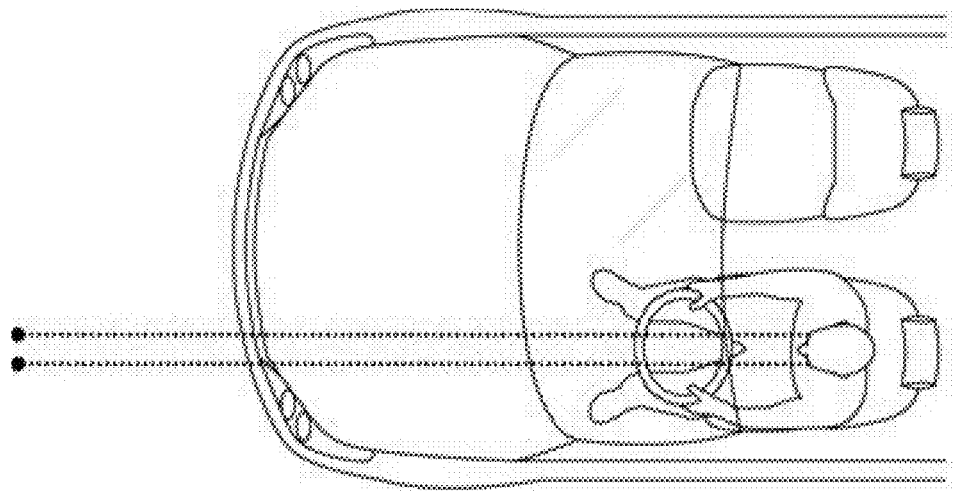
FIGS. 8A-8B are schematic diagrams depicting eye convergence in a vehicle, according to some embodiments.
Figure 8B:
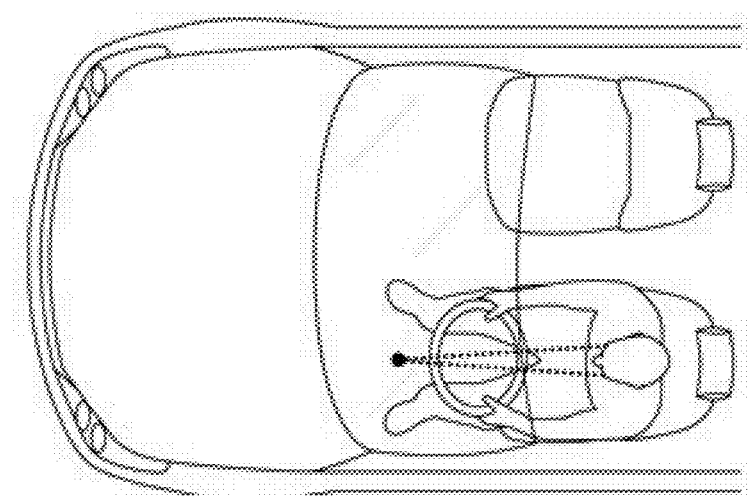

FIGS. 8A and 8B are schematic diagrams depicting eye convergence in a vehicle, according to some embodiments. FIG. 8A shows rays cast along the visual axes of two eyes. The rays are nearly parallel, and converge at some distance beyond the windshield of the vehicle. Accordingly, the gaze estimation module 406 can determine that the eyes are not focused on the windshield. FIG. 8B also shows rays cast along the visual axes of the two eyes. The rays converge at a point on the windshield. Accordingly, the gaze estimation module 406 can determine that the eyes are focused on the windshield. The methods discussed above with respect to FIGS. 6A and 6B can be used to determine the visual axis or optical axis of each eye in FIGS. 8A and 8B.

Figure 9A:
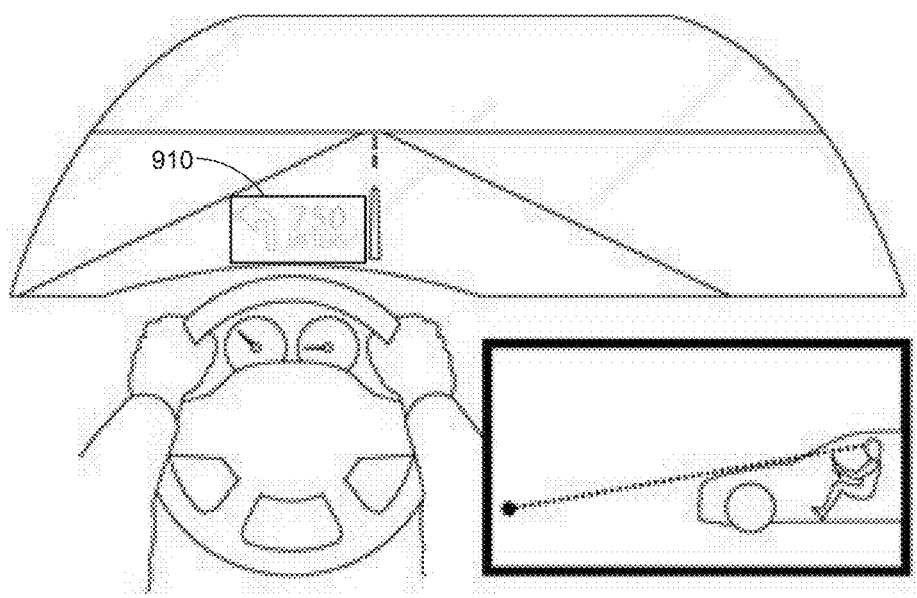
FIGS. 9A-9B are schematic diagrams depicting modifying a heads-up display in a vehicle, according to some embodiments.
Figure 9B:
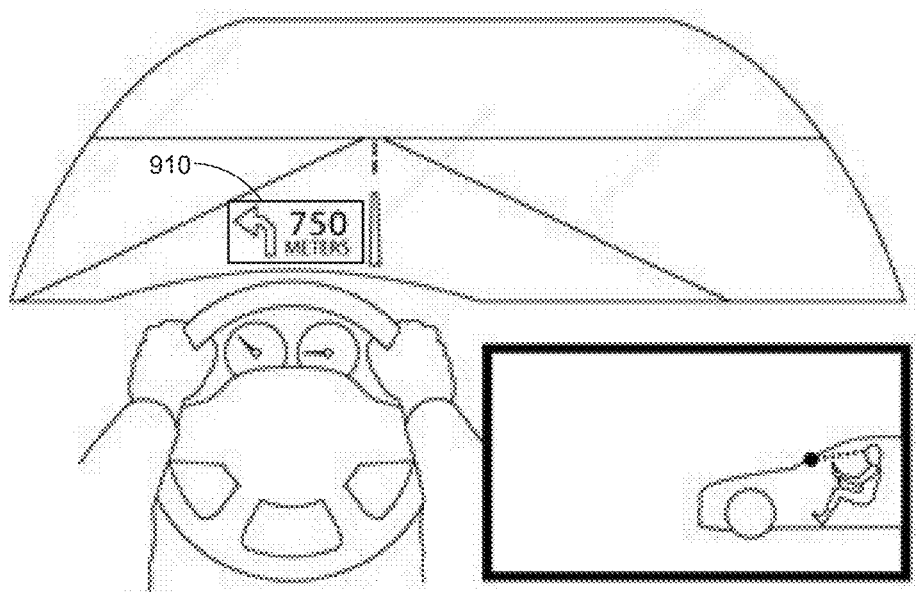

FIGS. 9A and 9B are schematic diagrams depicting modifying a heads-up display (HUD) 910 in a vehicle, according to some embodiments. The inset of FIG. 9A shows that the user's point of regard is on the road. Accordingly, the HUD 910 on the windshield (showing a left arrow and "750 meters") is almost completely transparent. The inset of FIG. 9B shows that the user's point of regard is on the windshield. Accordingly, the HUD 910 on the windshield has increased opacity.

Figure 10:
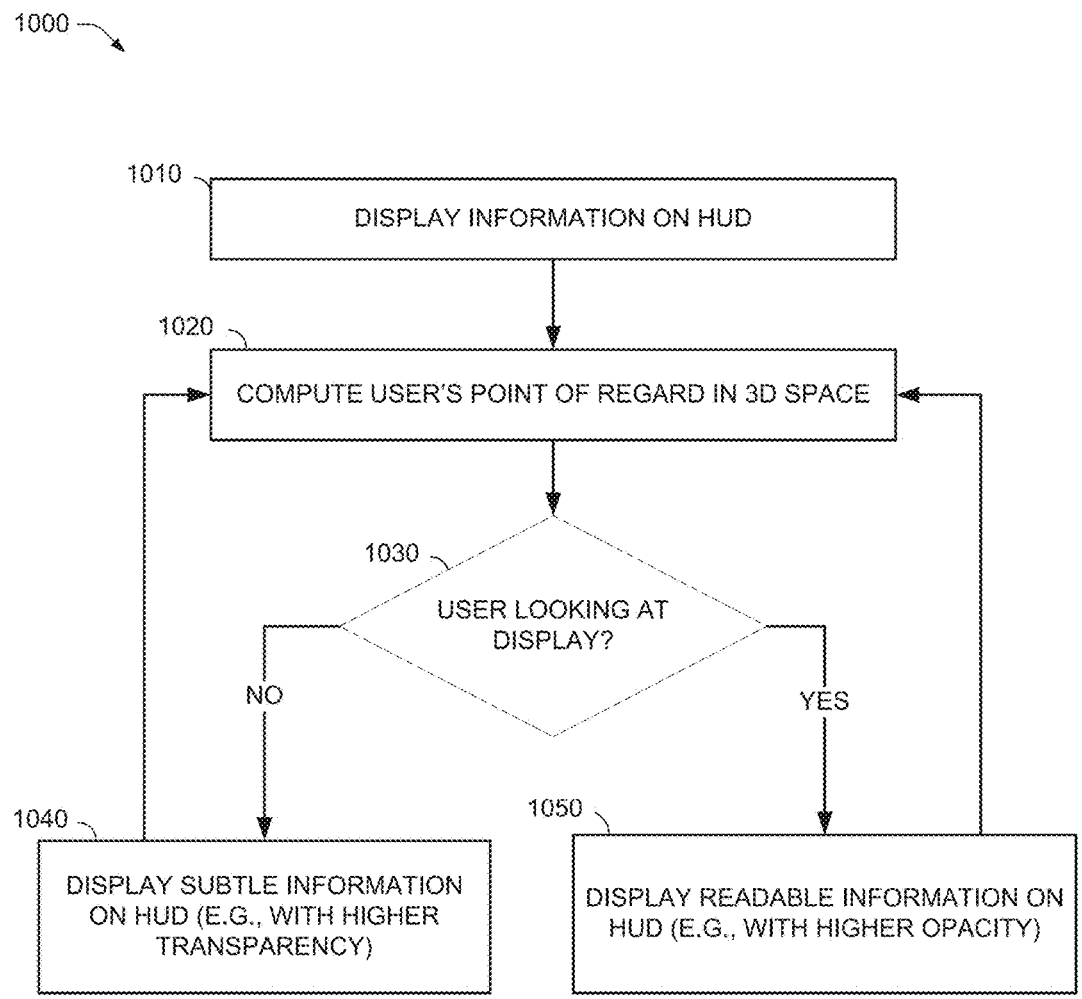
FIG. 10 is a flowchart of an example method of adjusting display visibility based on eye convergence, according to some embodiments.

FIG. 10 is a flowchart of an example method 1000 of adjusting display transparency based on eye convergence, according to some embodiments. Prior to detecting the eye convergence, user-specific eye tracking calibration may be performed. For example, by using systems and methods described in U.S. patent application Ser. No. 14/180,974, filed Feb. 14, 2014, entitled "Systems and Methods of Eye Tracking Calibration," which is incorporated herein by reference.

In operation 1010, information is displayed on a HUD. A HUD is a display designed to be viewed simultaneously with another view. For example, a HUD can be projected on a windshield or other semi-reflective surface (e.g., as shown in FIGS. 9A and 9B), displayed on a transparent LCD screen through which the user can see through, displayed on a small opaque screen near the user's eye, and so on. In one example embodiment, a HUD on a driver's windshield displays one or more of the speed of the vehicle, the RPM of the engine, and the next turn to take to get to a predetermined destination.

The user's point of regard in 3-D space is determined in operation 1020. Algorithms described above with respect to FIG. 6B may be used to determine the user's point of regard. If the user is looking at the HUD (operation 1030), then high-visibility information is displayed on the HUD (operation 1050). For example, the brightness or opacity of the information can be increased. If the user is not looking at the HUD, then the information is displayed more subtly (operation 1040). For example, the information can be dimmed or rendered more transparently.

The visibility of the information can be continually or repeatedly adjusted, based on continual or repeated computation of the user's point of regard in 3-D space. For example, based on a determination (or estimation) that the user may looking at the HUD, the opacity of the information may be increased. Then, based on a determination (or estimation) that the user maybe looking away from or through the HUD, the opacity of the information may be decreased. In some example embodiments, fixed values of visibility attributes are used. For example, a preset value of brightness can be used while the user is looking at the HUD and a different present value of brightness used while the user is not looking at the HUD. In other example embodiments, the visibility attributes change based on the amount of time the user meets one condition or the other. For example, after the user looks away from the HUD for a long period, the visibility of the HUD may be minimized or set at a minimum (e.g., have minimal brightness, minimal opacity, minimal clarity, minimal contrast, or any suitable combination thereof). Then, after the user looks at the HUD, the visibility of the HUD may increase at a preset rate, until a maximum visibility is reached (e.g., a maximal brightness, maximal opacity, maximal clarity, maximal brightness, or any suitable combination thereof). Similarly, when the user looks away from the HUD again, visibility may decrease at a preset rate until the minimum visibility is returned to. The preset rates may be different. For example, the rate of increase of opacity may be slow, for a pleasing effect, while the rate of decrease of opacity is fast, to allow the user quickly to react to whatever else is happening in the user's field of view. The minimal and maximal value of the adjusted attributes can be absolute values (e.g., the minimum and maximum values capable of being provided by the system), or arbitrary predetermined values (e.g., configured by the system, configured by the user, configured by an administrator, and so on). The minimal and maximal value of the adjusted attributes may depend on external factors, e.g. ambient illumination. For instance, a maximum brightness may have a lower value under night conditions, and a high value under daylight.

The methods and systems described herein may provide technical advantages over existing methods and systems, particularly with respect to human-machine (or human-vehicle) interfaces. For example, information displayed with high visibility on a HUD may be distracting to a user when the user is focused on other visible items. By reducing the visibility of the HUD when the user is focused elsewhere, distraction to the user can be reduced. In some cases, such as when the user is driving or piloting a vehicle, the reduction in distraction improves safety.

In some embodiments, a method may include determining a depth of focus of a user based on gaze information for two eyes of the user, displaying an object on a display, and/or adjusting visibility of the object displayed on the display based on the depth of focus of the user.

In some embodiments, the determining of the depth of focus based on the gaze information for the two eyes of the user may include determining a visual axis or an optical axis of each eye of the user.

In some embodiments, the adjusting of the visibility of the object may include adjusting an attribute of the visibility of the object.

In some embodiments, the adjusting of the visibility of the object may be displayed based on the depth of focus of the user.

In some embodiments, the attribute of the visibility of the object may include a transparency of the object.

In some embodiments, the attribute of the visibility of the object may include a brightness of the object.

In some embodiments, an attribute of the visibility of the object may include a location of the object.

In some embodiments, an attribute of the visibility of the object may include a size of the object.

In some embodiments, the adjusting of the visibility of the object may include adjusting an attribute of the display.

In some embodiments, this display is a heads-up display and the attribute of the display may include a transparency of the display.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 11:
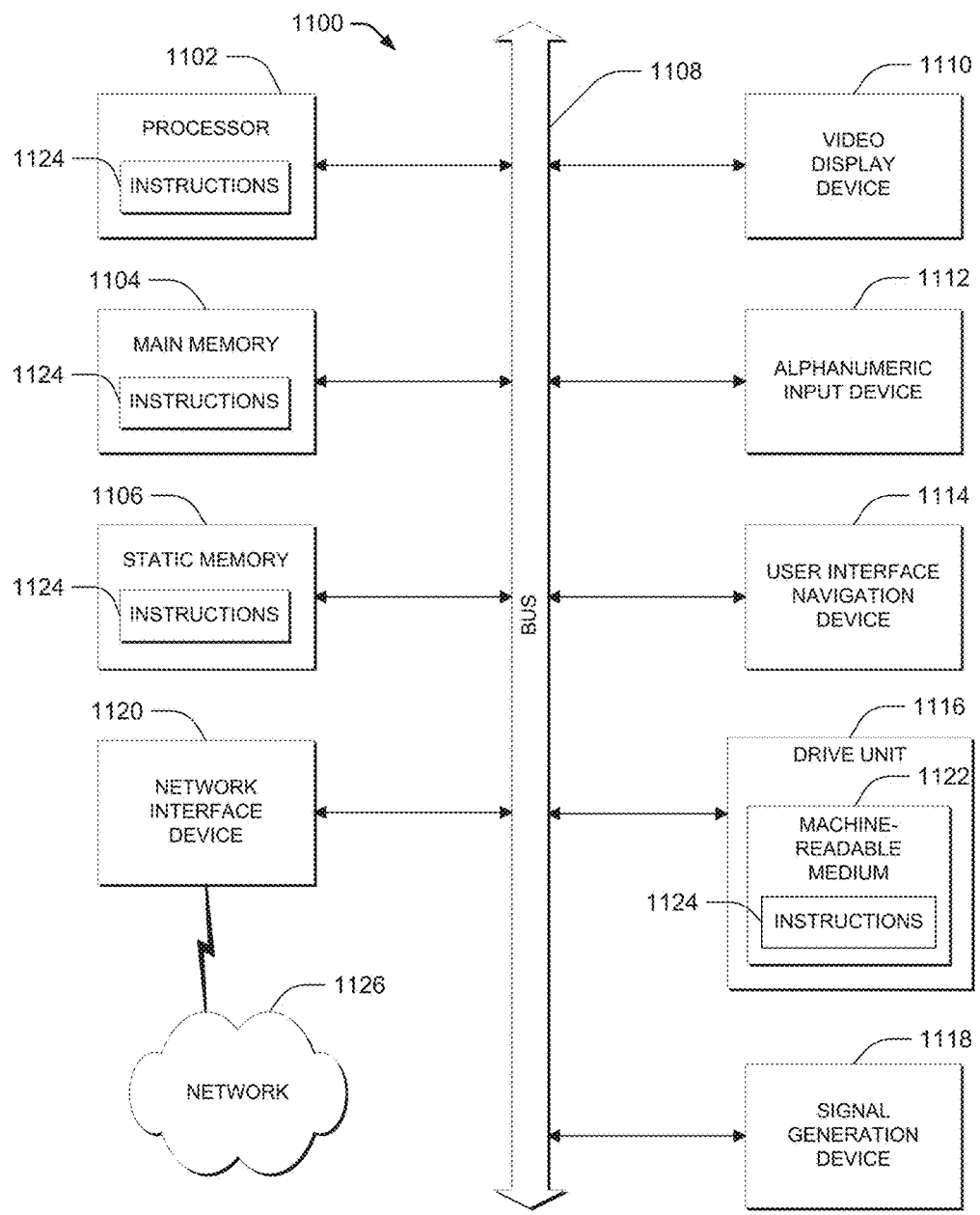
FIG. 11 is a block diagram of a machine in the example form of a computer system within which a set of instructions, for causing the machine to perform any one or more of the methodologies discussed herein, may be executed, according to some embodiments.

FIG. 11 is a block diagram of a machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1100 includes a processor 1102 (e.g., a CPU, a GPU, or both), a main memory 1104, and a static memory 1106, which communicate with each other via a bus 1108. Computer system 1100 may further include a video display device 1110 (e.g., a liquid crystal display (LCD) or a cathode ray tube (CRT)). Computer system 1100 also includes an alphanumeric input device 1112 (e.g., a keyboard), a user interface (UI) navigation device 1114 (e.g., a mouse or touch sensitive display), a disk drive unit 1116, a signal generation device 1118 (e.g., a speaker), and a network interface device 1120.

Disk drive unit 1116 includes a machine-readable medium 1122 on which is stored one or more sets of instructions and data structures (e.g., software) 1124 embodying or used by any one or more of the methodologies or functions described herein. Instructions 1124 may also reside, completely or at least partially, within main memory 1104, within static memory 1106, or within processor 1102 during execution thereof by computer system 1100, with main memory 1104 and processor 1102 also constituting machine-readable media.

While machine-readable medium 1122 is shown in an example embodiment to be a single medium, the term "machine-readable medium" may include a single medium or multiple media (e.g., a centralized or distributed database, or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present technology, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 1124 may further be transmitted or received over a communications network 1126 using a transmission medium. Instructions 1124 may be transmitted using network interface device 1120 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
    determining cornea center locations and pupil center locations for two eyes of a user using image data of the two eyes;
    determining an optical axis for each of the two eyes of the user based on the cornea center locations and the pupil center locations;
    determining a first three-dimensional (3D) point of regard of the user based on the optical axes for the two eyes of the user at a first time;
    displaying a virtual object on a display of an augmented reality headset;
    responsive to a determination that the first 3D point of regard of the user matches a position associated with the virtual object, the position having a different depth than a depth associated with the display of the augmented reality headset, adjusting a transparency of the display in a manner that increases visibility of the virtual object by increasing an opacity of the display at a rate of increase;
    determining a second 3D point of regard of the user based on the optical axes for the two eyes of the user at a second time after the first time; and
    responsive to a determination that the second 3D point of regard of the user does not match the position associated with the virtual object, adjusting a transparency of the display in a manner that decreases visibility of the virtual object by decreasing the opacity of the display at a rate of decrease, the rate of decrease being faster than the rate of increase.

2. The method of claim 1, wherein the 3D point of regard is determined based on visual axes for the two eyes of the user, the visual axes corresponding to the optical axes.

3. The method of claim 1, further comprising adjusting an attribute of the visibility of the virtual object being displayed in a manner that increases the visibility of the virtual object.

4. The method of claim 3, wherein the attribute of the visibility of the virtual object comprises a transparency of the virtual object.

5. The method of claim 3, wherein the attribute of the visibility of the virtual object comprises a brightness of the virtual object.

6. The method of claim 3, wherein the attribute of the visibility of the virtual object comprises a location of the virtual object.

7. The method of claim 3, wherein the attribute of the visibility of the virtual object comprises a size of the virtual object.

8. A system comprising:
    a display of an augmented reality headset; and
    a hardware-implemented eye tracking module configured to:
        determine cornea center locations and pupil center locations for two eyes of a user using image data of the two eyes;
        determine an optical axis for each of the two eyes of the user based on the cornea center locations and the pupil center locations;
        determine a first three-dimensional (3D) point of regard of the user based on the optical axes for the two eyes of the user at a first time;
    present a virtual object on the display;
    responsive to a determination that the first 3D point of regard of the user matches a position associated with the virtual object, the position having a different depth than a depth associated with the display of the augmented reality headset, adjust a transparency of the display in a manner that increases visibility of the virtual object by increasing an opacity of the display at a rate of increase;
        determine a second 3D point of regard of the user based on the optical axes for the two eyes of the user at a second time after the first time; and
        responsive to a determination that the second 3D point of regard of the user does not match the position associated with the virtual object, adjust a transparency of the display in a manner that decreases visibility of the virtual object by decreasing the opacity of the display at a rate of decrease, the rate of decrease being faster than the rate of increase.

9. The system of claim 8, wherein the 3D point of regard is determined based on visual axes for the two eyes of the user, the visual axes corresponding to the optical axes.

10. The system of claim 8, wherein the hardware-implemented eye tracking module is further configured to adjust an attribute of the visibility of the virtual object being displayed in a manner that increases the visibility of the virtual object.

11. The system of claim 10, wherein the attribute of the visibility of the virtual object comprises at least one of a transparency of the virtual object, a brightness of the virtual object, a location of the virtual object, and a size of the virtual object.

12. A system, comprising:

at least one processor; and executable instructions accessible on a computer-readable media that, when executed, cause the at least one processor to perform operations comprising:

determining cornea center locations and pupil center locations for the two eyes of a user using image data of the two eyes;

determining an optical axis for each of the two eyes of the user based on the cornea center locations and the pupil center locations;

determining a first three-dimensional (3D) point of regard of the user based on the optical axes for the two eyes of the user at a first time;

presenting a virtual object on a display of an augmented reality headset;

responsive to a determination that the first 3D point of regard of the user matches a position associated with the virtual object, the position having a different depth than a depth associated with the display of the augmented reality headset, adjusting a transparency of the display in a manner that increases visibility of the virtual object by increasing an opacity of the display at a rate of increase;

determining a second 3D point of regard of the user based on the optical axes for the two eyes of the user at a second time after the first time; and responsive to a determination that the second 3D point of regard of the user does not match the position associated with the virtual object, adjusting a transparency of the display in a manner that decreases visibility of the virtual object by decreasing the opacity of the display at a rate of decrease, the rate of decrease being faster than the rate of increase.

13. The system of claim 12, wherein the executable instructions, when executed, further cause the at least one processor to perform operations comprising:

displaying calibration targets at known positions on the display; and determining angular offsets between the calibration targets and the optical axes for the two eyes of the user while the user is looking at the calibration targets, the angular offsets comprising an alpha angle representing a horizontal offset and a beta angle representing a vertical offset.

14. The system of claim 13, wherein executable instructions, when executed, further cause the at least one processor to perform operations comprising:

applying the angular offsets to the determined optical axis to determine a visual axis.

15. The method of claim 2, further comprising:

displaying calibration targets at known positions on the display; and determining angular offsets between the visual axes and the optical axes for the two eyes of the user while the user is looking at the calibration targets, the angular offsets comprising an alpha angle representing a horizontal offset and a beta angle representing a vertical offset.

* * * * *